W. WERRY.
STEAM AND OTHER FLUID PRESSURE ENGINES.
APPLICATION FILED MAR. 17, 1913.
1,153,588.
Patented Sept. 14, 1915.
2 SHEETS—SHEET 1.
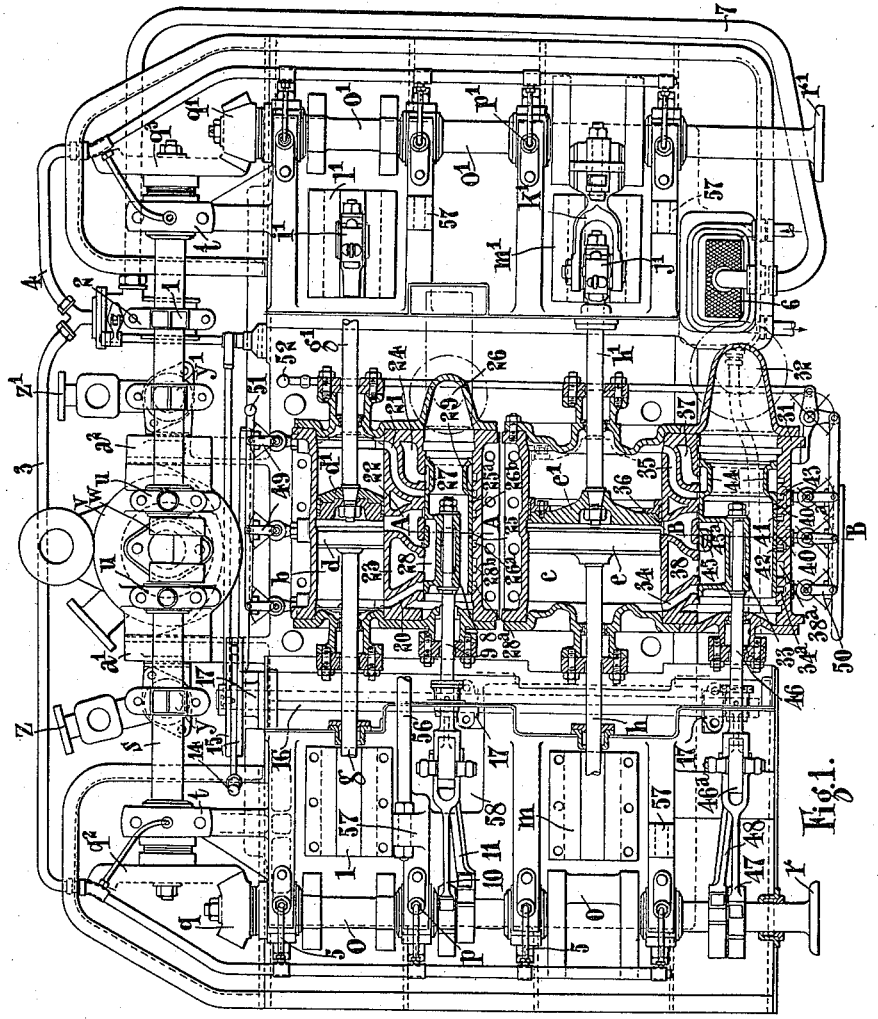
WITNESSES
H. N. Ramsey
C. A. Krey
INVENTOR:
William Werry,
BY
ATTORNEY

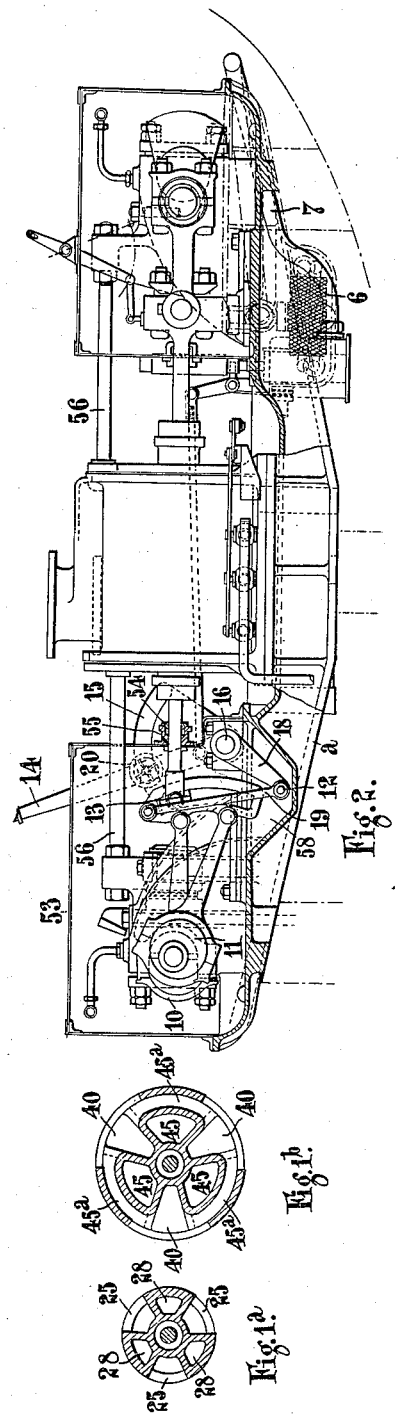

UNITED STATES PATENT OFFICE.

WILLIAM WERRY, OF LONDON, ENGLAND.

STEAM AND OTHER FLUID-PRESSURE ENGINE.

1,153,588.   Specification of Letters Patent.   Patented Sept. 14, 1915.

Application filed March 17, 1913. Serial No. 754,787.

*To all whom it may concern:*

Be it known that I, WILLIAM WERRY, a subject of the King of Great Britain and Ireland, and residing at 10 King William street, London, E. C., England, have invented certain new and useful Improvements in and Relating to Steam and other Fluid-Pressure Engines, of which the following is a specification.

My invention relates to steam power units for marine and other purposes of the type in which each cylinder is provided with two pistons for actuating separate crank shafts.

The object of the present invention is to produce an arrangement whereby power units of the type above indicated may be combined with other features relating to the control and distribution of the steam and the transmission of the motive power from the crank shafts whereby an economical arrangement is produced both with reference to the space that is occupied by the machinery, and to the use of the steam or motive power fluid that is involved.

Referring now to the accompanying drawings which illustrate my invention and form part of my specification, Figure 1 shows a plan partly in section of a compound engine constructed according to my invention; Fig. 1ª shows a section of the high pressure valve through the line A—A in Fig. 1; Fig. 1ᵇ shows a section of the low pressure valve through the line B—B in Fig. 1; Fig. 2 shows an elevation partly in section of the view shown in Fig. 1; Fig. 3 shows a cross section through the cylinders in Fig. 1.

In carrying my invention into effect according to one form, and as applied to an engine suitable for marine work, I mount the cylinders together with their distributing valve casings on a sole plate or entablature $a$, Figs. 1, 2 and 3.

In the present example the cylinders are arranged for a compound engine, but it will be understood that they may also be arranged if desired for engines with triple, quadruple or other number of expansions. In the high pressure cylinder, $b$, and low pressure cylinder, $c$, two pistons, $d$, $d'$, and $e$, $e'$, are arranged which are connected to piston rods, $g$, $h$, and $g'$, $h'$, the piston rods $g'$, $h'$, carrying cross-heads, $i'$, and $j'$, working in slides, $l'$ and $m'$. Similar cross-heads working in slides, $l$ and $m$, are carried by the piston rods, $g$ and $h$, but are omitted in order to avoid complexity in the drawings. The cross-heads are coupled up to the crank shafts, $o$ and $o'$, by connecting rods of the usual type, only one of which, $k'$, coöperating with the piston rod, $h'$, is shown.

The crank shafts are mounted in suitable bearings, $p$ and $p'$, formed on the sole plate, and carrying at one of their ends, bevel pinions, $q$ and $q'$, while flanges, $r$ and $r'$, are formed at their other ends for coupling to the propeller shafts. The pinions, $q$ and $q'$, intermesh with bevel wheels, $q^2$ and $q^3$, fixed to an equalizing shaft, $s$, mounted in bearings, $t$ and $u$. The bearings, $t$, are formed on the sole plate, $a$, while the bearings, $u$, are in the present case formed in one piece with the cover, $v$, of the air pump, $x$. The air pump, $x$, is attached by bolts to lugs, $a'$ and $a^2$, projecting from the sole plate. The shaft, $s$, is formed with a crank, $w$, for actuating the air pump piston and also carries eccentrics, $y$ and $y'$, for working feed pumps, $z$ and $z'$, and an eccentric, 1, for operating the lubricating pump, 2.

Pipes, 3 and 4, act as mains for conveying the oil from the lubricating pump, branches, 5, being taken off as required for leading the oil to the various bearings or other parts to be lubricated. The oil after lubricating the bearings or other parts is led to an oil cooler or strainer, 6, from which it is returned to the lubricating pump by the pipe, 7.

The distribution of the steam to the high pressure cylinder, $b$, is effected by means of a valve, 8, actuated by a spindle, 9, the necessary motion being imparted thereto for working in either direction by means of eccentric rods, 10 and 11. The eccentric rods are attached to a link, 12, of the usual type, in which a block, 13, attached to the end of the valve spindle, is adapted to slide. A hand lever, 14, sliding between quadrant-shaped members, 15, is attached to a shaft, 16, mounted in bearings, 17, on the sole plate. The shaft, 16, carries an arm, 18, which is connected to the link, 12, by a rod, 19.

By operating the hand lever, 14, the link, 12, may be positioned so as to bring either of the eccentrics into operative relationship with the valve spindle for driving the engine either in the ahead or astern direction.

A hand wheel, 20, is provided for securing the hand lever, 14, in any desired position with respect to the quadrant members, 15.

The high pressure cylinder, b, has ports, 20 and 21, for leading steam to and from the ends of the cylinder and a double port, 22, for leading steam to and from the space between the pistons. Ports, 23 and 24, lead to the exhaust pipe, 30. The valve, 8, is provided with sets of ports, 25 and 25ª, Figs. 1 and 1ª, for supplying steam to the double port, 22, on one stroke, the ports, 25ª, also being used to supply steam to the port, 21, on the other stroke of the pistons. Three conduits, 28, are also provided on the valve for placing the double port, 22, in communication with the exhaust port, 23, on one stroke of the pistons and the port, 20, in communication with the exhaust port, 23, on the other stroke of the pistons.

Steam from the boiler enters the high pressure valve casing by the pipe, 26, and has free access to the interior of the valve. If it is assumed that the pistons are starting on their out-stroke, the valve will have moved to the left of the position shown in Fig. 1, so that the sets of ports, 25 and 25ª, communicate with annular recesses, 26ª, and 26ᵇ, formed in the valve casing. Steam will thus enter the double port, 22, and the pistons, g and g', are forced outward and apart. When the valve is in the above position, the neck 27, causes the port, 21, to be placed in communication with the exhaust port, 24, while the conduits, 28, place the port, 20, in communication with the exhaust port, 23, by means of the annular recesses, 28ª and 28ᵇ. Accordingly, when the space between the pistons is receiving steam the space between each of the pistons and the end of the cylinder is in communication with the exhaust. When the outstroke of the pistons has been completed the valve will have moved into a position to the right of that shown in Fig. 1, such that the ports, 25ª, place the annular recess, 29, and the port, 21, in communication with the steam supply, and also uncovers the port, 20, which will then be open to steam. The double port, 22, will by means of the annular recesses, 26ª and 26ᵇ, at this time be in communication with the conduits, 28, which register with the annular recess, 28ᵇ, and the exhaust port, 23.

At the commencement of the instroke of the pistons, the space between the pistons and the cylinder ends will be in communication with the steam supply, while the space between the pistons is in communication with the exhaust. The exhaust from the high pressure cylinder, b, enters the low pressure valve casing, 31, by the pipe, 32. The valve, 33, for distributing steam to the low pressure cylinder is similar to the valve just described. The ports, 34 and 35, lead steam to and from the cylinder ends, the double port, 36, leads steam to and from the space between the pistons, while the ports, 37 and 38, communicate with the pipe, 39, leading to the condenser.

Sets of ports, 40 and 40ª, on the valve, Figs. 1 and 1ᵇ, register with annular recesses, 41 and 42, in the valve casing when steam is being supplied to the space between the pistons on one stroke, while the ports, 40ª, also register when necessary with the annular recess 43, for supplying steam to the port, 35, on the other stroke of the pistons. The neck, 44, allows the port, 35, to be placed in communication with the exhaust port, 37, and conduits, 45, allow the double port, 36, to be placed in communication with the exhaust port, 38, through the annular recesses, 41, 42, 38ª. The conduits, 45, also allow the port, 34, to be placed in communication with the exhaust through the annular recesses, 34ª and 38ª. The valve has three conduits, 45, formed therein as before, while the steam spaces interposed therebetween are interconnected by passages, 45ª.

The valve, 33, is actuated by a spindle, 46, which carries a block, similar to the block, 13, before described. The block slides in a slotted link, 46ª, which co-acts with eccentric rods, 47, and 48, for working either in the ahead or astern direction as desired.

The position of the link, 46ª, is determined by the hand lever, 14, and mechanism similar to that above described for the high pressure cylinder.

On the outstroke of the pistons, steam is being supplied through the ports, 40 and 40ª, to the double port, 36, while the ports, 34 and 35, are placed in communication with the exhaust ports, 37 and 38, by means of the conduits, 45, and the neck, 44, respectively. On the instroke, steam is supplied to the port, 35, by the ports, 40ª, communicating with the annular recess, 43, and also to the port, 34, as this port is open to steam as the valve moves toward the right in Fig. 1. The double port, 36, is placed in communication with the exhaust on this stroke by means of the conduits, 45.

The valves, 8 and 33, are provided with the necessary amount of lap for giving the desired expansion ratio of steam in their respective cylinders.

Drain cocks, 49 and 50, on the high pressure and low pressure cylinders respectively are provided, the cocks, 49, being simultaneously operated by the handle, 51, and the cocks, 50, in a like manner by the handle, 52.

The crank shafts, o and o', with the connecting and eccentric rods, coöperating therewith, and also the bevel gearing are inclosed within a casing, 53, glands, 54, and stuffing boxes, 55, being provided at those points where the valve spindles or piston rods enter the casing.

Stays, 56, are provided between the cylinders and the lugs, 57, in the sole plate, in order to increase the rigidity of the structure.

In the arrangement which I have just described, as the valves are of the cylindrical balanced type and the ports are arranged so that the clearance space is reduced to a minimum, I am enabled to obtain very high economy and efficiency. Further, as a double port controls the passage leading to the space between the pistons, I am able to supply the necessary volume of steam to this space without throttling of the same.

By inclosing the moving parts of the engine as before described, I am enabled to apply forced lubrication to the working parts, which may be automatically supplied. The sole plate may also be shaped on the under sides as shown in Fig. 2 in order to be carried on the frames of the ship.

Although I have described my improvements as applied to a marine engine, yet it will be evident that it is not limited to such application as it may also be utilized for locomotives, electric light installations, and for factory, mining or other purposes.

Having now described my invention what I claim as new and desire to secure by Letters Patent is:—

1. In an elastic fluid engine in which double pistons move in opposite directions in each cylinder, the combination of double ports in said cylinders for leading working fluid to and from the space between said pistons, single ports for leading working fluid to and from the ends of said cylinders, a valve for distributing the working fluid, internal passages in said valve for live working fluid, a second set of internal passages spaced alternately with said first-mentioned set for exhausting working fluid, both sets of said passages coöperating in the admission and exhaust of working fluid to and from said double ports substantially as described.

2. In an elastic fluid engine in which double pistons move in opposite directions in each cylinder, the combination of double ports in said cylinders for leading working fluid to and from the space between said pistons, single ports in said cylinders for leading working fluid to and from the ends of said cylinders, a valve for distributing working fluid, internal passages in said valve for live working fluid, a second set of internal passages spaced alternately with said first-mentioned set for exhaust working fluid, both sets of said passages coöperating in the admission and exhaust of working fluid to and from said double ports, said passages for live working fluid communicating with common ducts leading to said double ports by means of holes in said valve.

3. In an elastic fluid engine in which double pistons move in opposite directions in each cylinder, the combination of double ports in said cylinders for leading working fluid to and from the space between said pistons, single ports in said cylinders for leading working fluid to and from the ends of said cylinders, a valve for distributing working fluid, internal passages in said valve for live working fluid, a second set of internal passages spaced alternately with said first-mentioned set for exhaust working fluid, both sets of said passages coöperating in the admission and exhaust of working fluid to and from said double ports, cross-ducts in said valve intercommunicating with said live working fluid passages, said passages for live working fluid communicating with common ducts leading to said double ports by means of holes in said valve.

In testimony whereof I have signed my name to this specification in the presence of two subscribing witnesses.

WILLIAM WERRY.

Witnesses:
W. WARREN TRIGG,
BENTON H. MATTHEWS.